United States Patent
Hsieh et al.

(10) Patent No.: US 9,144,019 B2
(45) Date of Patent: Sep. 22, 2015

(54) NETWORK SEARCHING METHOD FOR REDUCING POWER CONSUMPTION AND MOBILE ELECTRONIC DEVICE USING THE SAME

(71) Applicant: Wistron Corporation, New Taipei (TW)

(72) Inventors: Chwu-Wuang Hsieh, New Taipei (TW); Leong-Tee Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 164 days.

(21) Appl. No.: 13/893,306

(22) Filed: May 13, 2013

(65) Prior Publication Data

US 2014/0100003 A1  Apr. 10, 2014

(30) Foreign Application Priority Data

Oct. 5, 2012 (TW) .............................. 101136945 A

(51) Int. Cl.
*H04W 52/02* (2009.01)
*H04W 48/16* (2009.01)

(52) U.S. Cl.
CPC .......... *H04W 52/0241* (2013.01); *H04W 48/16* (2013.01); *Y02B 60/50* (2013.01)

(58) Field of Classification Search
None
See application file for complete search history.

(56) References Cited

U.S. PATENT DOCUMENTS

| 2004/0198302 A1* | 10/2004 | Hutchison et al. ......... 455/343.1 |
| 2009/0073871 A1 | 3/2009 | Ko et al. |
| 2010/0002611 A1* | 1/2010 | Umatt et al. .................. 370/311 |
| 2013/0100944 A1* | 4/2013 | Kwon et al. .................. 370/338 |

FOREIGN PATENT DOCUMENTS

CN  1675949  9/2005

OTHER PUBLICATIONS

"Office Action of Taiwan Counterpart Application", issued on Aug. 25, 2014, p. 1-8, with English translation thereof.

* cited by examiner

*Primary Examiner* — Philip Sobutka
(74) *Attorney, Agent, or Firm* — Jianq Chyun IP Office

(57) ABSTRACT

A network searching method adapted to a mobile electronic device in a no service state is provided. In the method, a first timer is activated. A network searching operation is performed. Whether an available network is found is determined. If the available network is not found, whether a time count of the first timer is smaller than a network searching active interval is determined. If the time count is not smaller than the network searching active interval, a second timer is activated. Before a network searching inactive interval set up by the second timer expires, the mobile electronic device is controlled to remain in a power save mode. If the time count is smaller than the network searching active interval, a third timer is activated. When a sleep interval set up by the third timer expires, the mobile electronic device is controlled to perform the network searching operation again.

14 Claims, 4 Drawing Sheets

NETWORK SEARCHING METHOD FOR REDUCING POWER CONSUMPTION AND MOBILE ELECTRONIC DEVICE USING THE SAME

CROSS-REFERENCE TO RELATED APPLICATION

This application claims the priority benefit of Taiwan application serial no. 101136945, filed on Oct. 5, 2012. The entirety of the above-mentioned patent application is hereby incorporated by reference herein and made a part of this specification.

BACKGROUND OF THE INVENTION

1. Field of the Invention

The invention generally relates to a network searching method adapted to a mobile electronic device, and more particularly, to a network searching method adapted to a mobile electronic device in a no service state.

2. Description of Related Art

Generally, when there is no service available, a mobile electronic device (for example, a cell phone or a smart phone) keeps performing a network searching operation until it finds and connects to an available network. As a result, the battery power of the mobile electronic device is quickly consumed. For example, one may leave his or her cell phone in the car and park the car in the basement. As a result, the cell phone remains in a no service state for a very long time therefore cannot register with any available network. Based on the existing technique, the cell phone keeps searching for an available network at regular intervals until the battery power is exhausted.

FIG. 1 is a networking searching timing diagram of a conventional mobile electronic device in a no service state. Referring to FIG. 1, the abscissa represents time in unit of second. The period from time t1 to time t2 is referred to as a search interval I1. During the search interval I1, the mobile electronic device performs a network searching operation. In the present embodiment, the search interval I1 is, for example, 5 seconds. The period from time t2 to time t3 is referred to as a sleep interval I2. If the mobile electronic device does not find any available network, it stops searching for any network during the sleep interval. In the present embodiment, the sleep interval I2 is, for example, 30 seconds. The sleep interval is followed by another search interval, during which the mobile electronic device performs another network searching operation. If the mobile electronic device cannot find any available network, it repeatedly performs and stops the network searching operation until an available network is found or the battery power of the mobile electronic device is exhausted.

In another existing network searching method, the sleep interval is set to a variable value, and the longer the mobile electronic device remains in the no service state, the longer the sleep interval is. Such a design contradicts the communication protocol compatibility test specified by the 3rd Generation Partnership Project (3GPP). Besides, when the mobile electronic device moves to a valid network coverage area, it may not be able to resume the network searching operation due to the overlong sleep interval. As a result, an unpleasant experience is brought to the end user.

SUMMARY OF THE INVENTION

Accordingly, the invention is directed to a network searching method and a mobile electronic device using the same, in which the standby time of the mobile electronic device in a no service state is effectively prolonged so that a power saving effect is achieved.

The invention provides a network searching method adapted to a mobile electronic device in a no service state. The network searching method includes following steps. A first timer is activated. A network searching operation is performed. Whether an available network is found is determined. If the available network is not found, whether a time count of the first timer is smaller than a network searching active interval is determined. If the time count is not smaller than the network searching active interval, a second timer is activated. Before a network searching inactive interval set up by the second timer expires, the mobile electronic device is controlled to remain in a power save mode. If the time count is smaller than the network searching active interval, a third timer is activated. When a sleep interval set up by the third timer expires, the step of performing the network searching operation is executed again.

The invention further provides a mobile electronic device including a wireless communication module, a first timer, a second timer, a third timer, and a processor. The wireless communication module searches for an available network. When the wireless communication module detects that the mobile electronic device is in a no service state, the first timer starts counting and records a time count. The second timer sets up a network searching inactive interval. The third timer sets up a sleep interval. The processor is coupled to the wireless communication module, the first timer, the second timer, and the third timer. If the wireless communication module does not find the available network, the processor determines whether the time count is smaller than a network searching active interval. If the time count is not smaller than the network searching active interval, the processor generates a control signal to activate the second timer, and before the network searching inactive interval set up by the second timer expires, the processor controls the mobile electronic device to remain in a power save mode. If the time count is smaller than the network searching active interval, the processor generates the control signal to activate the third timer. Every time when the sleep interval expires, the processor controls the wireless communication module to search for the available network again.

As described above, the invention provides a network searching method and a mobile electronic device using the same, in which a network searching inactive interval is configured to prolong the standby time of the mobile electronic device when the mobile electronic device is in a no service area, so that a power saving effect is achieved.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
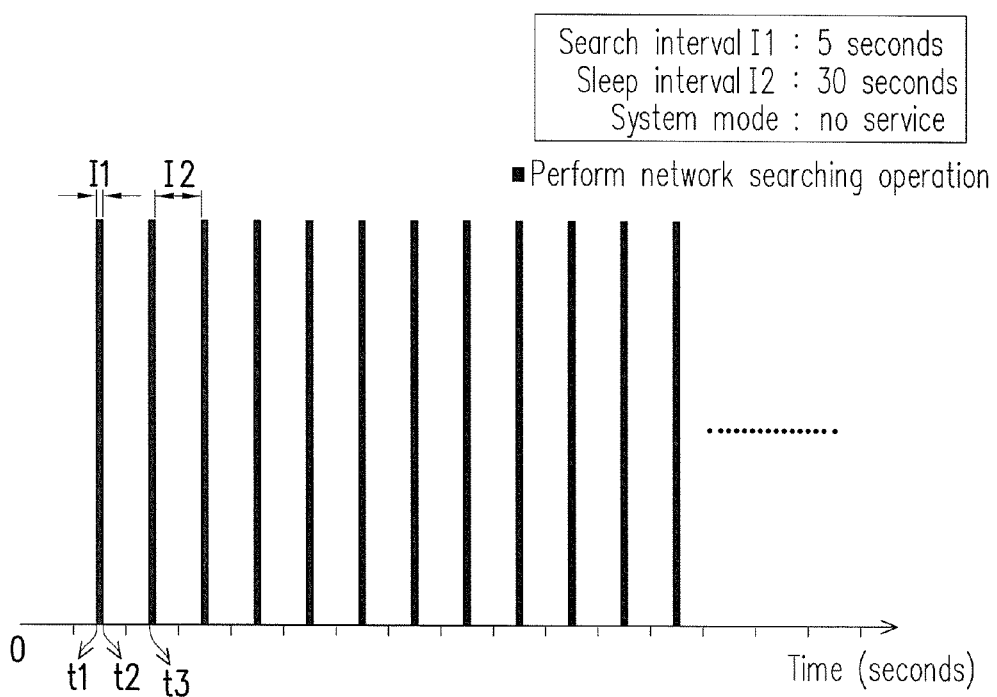
FIG. 1 is a networking searching timing diagram of a conventional mobile electronic device in a no service state.

Reference will now be made in detail to the present preferred embodiments of the invention, examples of which are illustrated in the accompanying drawings. Wherever possible, the same reference numbers are used in the drawings and the description to refer to the same or like parts.

Figure 2:
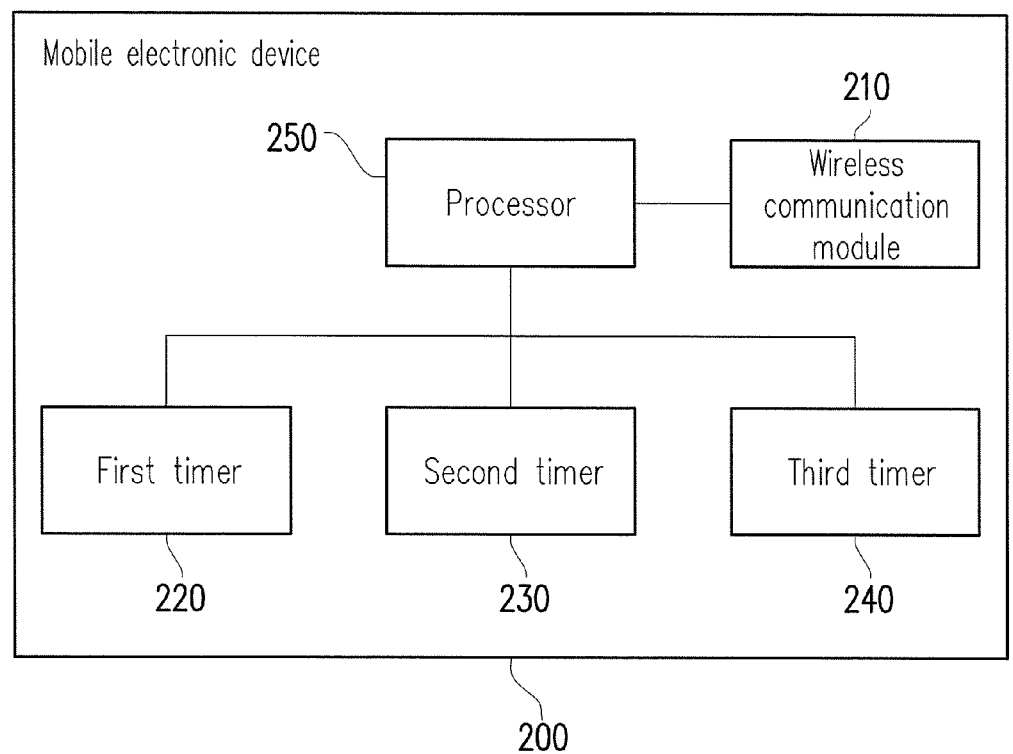
FIG. 2 is a block diagram of a mobile electronic device according to an embodiment of the invention.

FIG. 2 is a block diagram of a mobile electronic device according to an embodiment of the invention. Referring to FIG. 2, the mobile electronic device 200 in the present embodiment may be a cell phone, a smart phone, or a tablet PC with the mobile network connection function. A mobile network may be a second generation telecommunication (2G) network or a third generation telecommunication (3G) network. However, the invention is not limited thereto. The mobile electronic device 200 includes a wireless communication module 210, a first timer 220, a second timer 230, a third timer 240, and a processor 250. The functions of these elements will be respectively described below.

The wireless communication module 210 performs a network searching operation to search for an available network. Herein the network searching operation may be a cell searching operation. According to the concept of cell search, a mobile electronic device searches for any existing mobile network when it is just powered on or is in a no service state, and when a mobile network is found, the mobile electronic device finds out the access point with the strongest signal intensity to register with and connect to the access point.

When the wireless communication module 210 detects that the mobile electronic device 200 is in the no service state, the first timer 220 starts counting and records a time count. In addition, when the first timer 220 receives a reset signal from the processor 250, it re-starts counting. The second timer 230 sets up a network searching inactive interval. During the network searching inactive interval, the mobile electronic device 200 enters a power save mode (i.e., the wireless communication module 210 completely stops searching for the available network). The third timer 240 sets up a sleep interval. The wireless communication module 210 temporarily stops searching for the available network during the sleep interval but resumes the network searching operation after the sleep interval expires.

The processor 250 is coupled to the wireless communication module 210, the first timer 220, the second timer 230, and the third timer 240. The processor 250 may be a central processing unit (CPU) or a programmable microprocessor for a general purpose or a specific purpose.

However, it should be noted that besides the components mentioned above, the mobile electronic device 200 may further include other hardware devices, such as a memory unit and an input device. The components of the mobile electronic device 200 are not limited in the invention.

Figure 3:
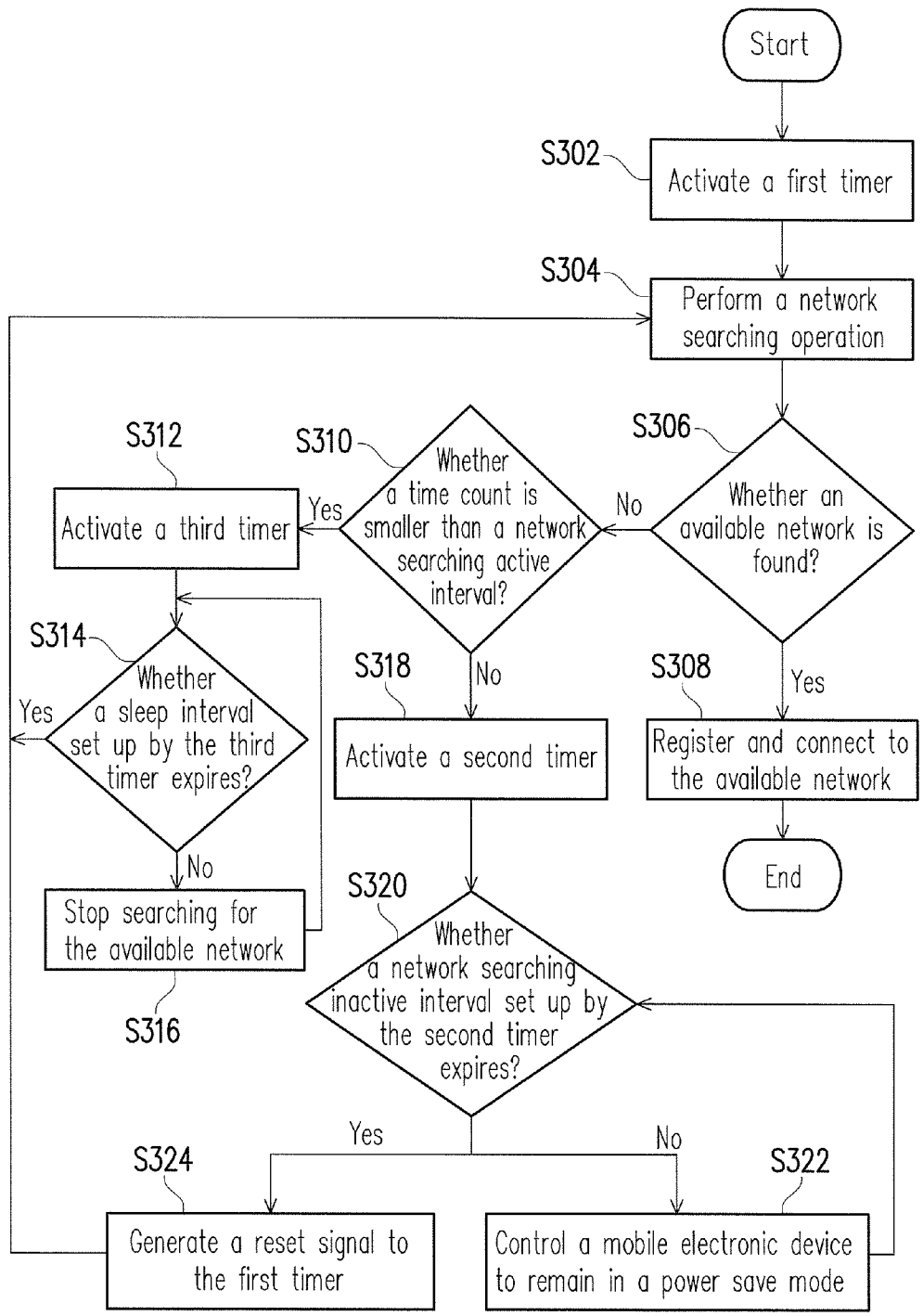
FIG. 3 is a flowchart of a network searching method according to an embodiment of the invention.

FIG. 3 is a flowchart of a network searching method according to an embodiment of the invention. The network searching method in the present embodiment is adapted to the mobile electronic device 200 illustrated in FIG. 2. Below, the network searching method in the present embodiment will be explained in detail with reference to various components of the mobile electronic device 200.

Referring to FIG. 3, in the present embodiment, it is assumed that the mobile electronic device 200 is in a no service state. For example, if the mobile electronic device 200 is a mobile phone, the no service state thereof means that the mobile phone cannot be used for making any, even an emergent, phone call. In this case, in step S302, the processor 250 generates a control signal to activate the first timer 220, so that the first timer 220 starts counting. Then, in step S304, the wireless communication module 210 performs a network searching operation (i.e., searching for any available mobile network through cell search). In step S306, whether the wireless communication module 210 finds an available network is determined. If the wireless communication module 210 does find an available network, in step S308, the wireless communication module 210 performs a registration procedure to connect to the available network.

If the wireless communication module 210 does not find any available network, in step S310, whether the current time count of the first timer 220 is smaller than a network searching active interval is determined. In the present embodiment, the network searching active interval must be set to a value greater than 240 seconds in order to conform to the communication protocol compatibility test specified by the 3rd Generation Partnership Project (3GPP). In the 3GPP test project, a mobile electronic device should complete network registration within the specified network searching time (i.e., 240 seconds). Namely, an access point may send a signal to the mobile electronic device at any time within 240 seconds. Thus, the mobile electronic device 200 cannot enter the power save mode mentioned in the present embodiment within the 240 seconds.

If the current time count of the first timer 220 is smaller than the network searching active interval, in step S312, the processor 250 generates a control signal to activate the third timer 240. The third timer 240 sets up a short sleep interval. In next step S314, whether the sleep interval expires is determined. If the sleep interval does not expire yet, the wireless communication module 210 stops searching for the available network during the sleep interval (step S316). When the sleep interval set up by the third timer 240 expires, the network searching operation is performed again (i.e., step S304 is executed again) to search for an available network. In other words, the mobile electronic device 200 periodically performs the network searching operation during the network searching active interval.

On the other hand, if the current time count of the first timer 220 is not smaller than the network searching active interval (i.e., the mobile electronic device 200 does not find any available network after the network searching time specified by the 3GPP expires), the processor 250 generates a control signal to activate the second timer 230 (step S318). The second timer 230 sets up a network searching inactive interval. Besides, in step S320, whether the network searching inactive interval set up by the second timer 230 expires is determined. If the network searching inactive interval set up by the second timer 230 does not expire, in step S322, the mobile electronic device 200 is controlled to enter the power save mode. In the power save mode, the wireless communication module 210 completely stops any network searching operation. If the mobile electronic device 200 does not find any available network when the network searching active interval expires, the mobile electronic device 200 is most likely in a no service area (for example, a basement). In this case, if the mobile electronic device 200 continues to perform the network searching operation periodically, the battery power is unnecessarily consumed and the standby time of the mobile electronic device 200 is shortened. Thus, in the invention, the mobile electronic device 200 is controlled to enter a deep sleep state to reduce the power consumption thereof. The duration of the deep sleep is the network searching inactive interval. A longer network searching inactive interval leads to a longer standby time of the mobile electronic device 200 in the no service area, and vice versa. In order to reduce the power consumption effectively, in the present embodiment, the network searching inactive interval is set to be greater than the sleep interval.

Because the mobile electronic device 200 may move from a no service area to a valid network coverage area, when the network searching inactive interval expires, the processor 250 generates a reset signal to the first timer 220 to allow the first timer 220 to start counting again (step S324). Besides, step S304 is executed to enter the network searching active interval and perform the network searching operation once again.

Figure 4:
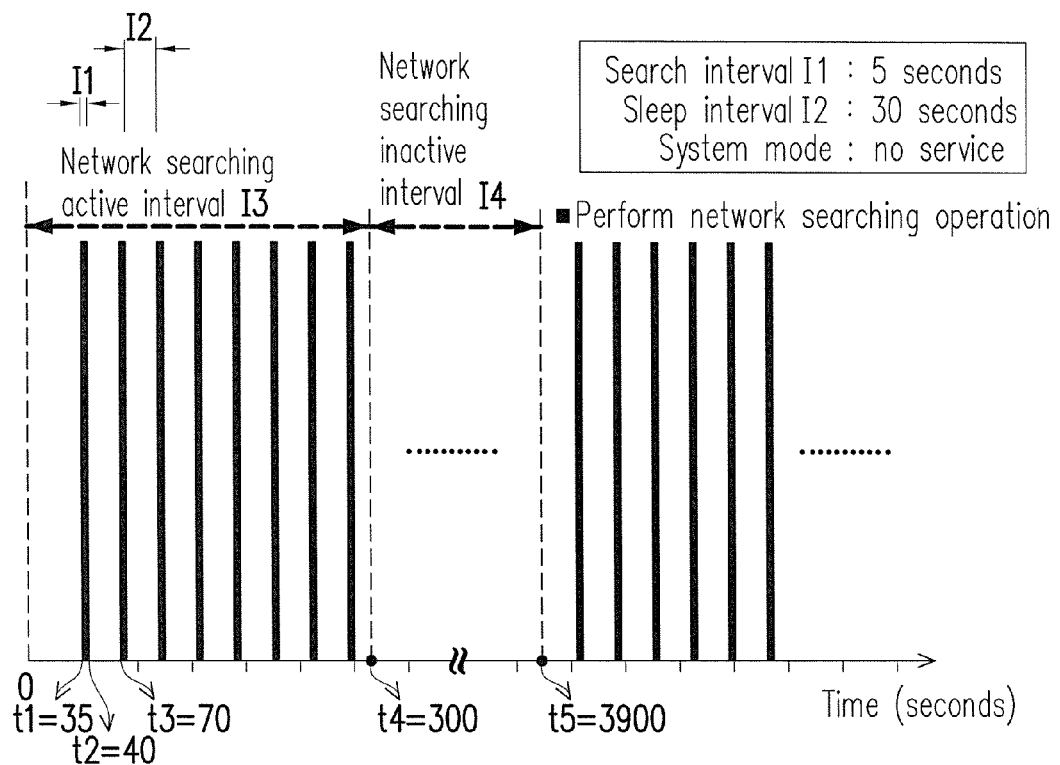
FIG. 4 is a network searching timing diagram of a mobile electronic device in a no service state according to an embodiment of the invention.

FIG. 4 is a network searching timing diagram of a mobile electronic device in a no service state according to an embodiment of the invention. Referring to both FIG. 2 and FIG. 4, in the present embodiment, the search interval I1 is set to 5 seconds, the sleep interval I2 is set to 30 seconds, the network searching active interval I3 is set to 300 seconds, and the network searching inactive interval I4 is set to 3600 seconds. It should be noted that foregoing settings are only used in an embodiment of the invention, and those having ordinary knowledge in the art can set the values of aforementioned intervals according to the actual requirement. As shown in FIG. 4, assuming that the network searching operation is performed for the first time when the time t1 is 35 seconds, because the search interval I1 is 5 seconds, the first network searching operation is ended when the time t2 is 40 seconds. If the mobile electronic device 200 does not find any available network, the sleep interval I2 is entered. During the 30 seconds of the sleep interval I2, the mobile electronic device 200 stops searching for a network, and so on. During the network searching active interval I3, the mobile electronic device 200 periodically performs and stops the network searching operation. After 300 seconds, the mobile electronic device 200 enters the network searching inactive interval I4. During the network searching inactive interval I4, the mobile electronic device 200 completely stops any network searching operation (i.e., falls into deep sleep). Thereby, the standby time of the mobile electronic device 200 is prolonged.

After one hour (i.e., 3600 seconds, when time t5 is equal to 3900 seconds), the first timer 220 of the mobile electronic device 200 receives a reset signal therefore is reset. Namely, the mobile electronic device 200 enters the network searching active interval I3 and performs a network searching operation again. It should be noted that the maximum value of the time count recorded by the first timer 220 is equal to the sum of the network searching active interval I3 and the network searching inactive interval I4. In the present embodiment, the maximum value of the time count recorded by the first timer 220 is 3900 seconds.

In short, in the present embodiment, when the mobile electronic device 200 is in the no service area, it performs the network searching operation for 300 seconds. If there is still no available network for the mobile electronic device 200 to register, after the network searching active interval I3 (i.e., 300 seconds), the mobile electronic device 200 enters the power save mode (i.e., the wireless communication module 210 enters a deep sleep state and stops searching for a network). After the network searching inactive interval (i.e., 3600 seconds) expires, the mobile electronic device 200 performs a network searching operation again.

As described above, in the invention, the network searching active interval is set to a value greater than 240 seconds, and the sleep interval is set to a fixed value, so that the requirements of the 3GPP compatibility test are completely satisfied. In addition, the standby time of a mobile electronic device in a no service area is prolonged through the setting of the network searching inactive interval. After the network searching inactive interval expires, a network searching operation can be performed again to determine whether the mobile electronic device has moved to a valid network coverage area. Thereby, the invention can effectively prolong the standby time of the mobile electronic device and reduce the power consumption thereof. Furthermore, the invention brings a pleasant user experience to the end user of the mobile electronic device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A network searching method, adapted to a mobile electronic device in a no service state, the network searching method comprising:
   activating a first timer;
   performing a network searching operation;
   determining whether an available network is found,
   when the available network is not found, determining whether a time count of the first timer is smaller than a network searching active interval,
   when the time count is not smaller than the network searching active interval, activating a second timer, wherein before a network searching inactive interval set up by the second timer expires, the mobile electronic device is controlled to remain in a power save mode, and
   when the time count is smaller than the network searching active interval, activating a third timer, wherein when a sleep interval set up by the third timer expires, the step of performing the network searching operation is executed again.

2. The network searching method according to claim 1, wherein when the network searching inactive interval set up by the second timer expires, the first timer is reset and the step of performing the network searching operation is executed again.

3. The network searching method according to claim 1, wherein when the mobile electronic device is in the power save mode, the mobile electronic device is controlled to stop searching for the available network.

4. The network searching method according to claim 1, wherein the network searching inactive interval is greater than the sleep interval.

5. The network searching method according to claim 1, wherein a maximum value of the time count is equal to a sum of the network searching active interval and the network searching inactive interval.

6. The network searching method according to claim 1, wherein the network searching active interval is greater than 240 seconds.

7. The network searching method according to claim 1, wherein when the mobile electronic device finds the available network, the available network is registered to be connected.

8. A mobile electronic device, comprising:
   a wireless communication module, searching for an available network;
   a first timer, wherein when the mobile electronic device is in a no service state, the first timer starts counting and records a time count;

a second timer, setting up a network searching inactive interval;

a third timer, setting up a sleep interval; and a processor, coupled to the wireless communication module, the first timer, the second timer, and the third timer, wherein when the wireless communication module does not find the available network, the processor determines whether the time count is smaller than a network searching active interval, when the time count is not smaller than the network searching active interval, the processor generates a control signal to activate the second timer, and before the network searching inactive interval set up by the second timer expires, the processor controls the mobile electronic device to remain in a power save mode, when the time count is smaller than the network searching active interval, the processor generates the control signal to activate the third timer, and every time when the sleep interval expires, the processor controls the wireless communication module to search for the available network.

9. The mobile electronic device according to claim 8, wherein when the network searching inactive interval set up by the second timer expires:

the processor generates a reset signal for the first timer, such that when the first timer starts counting again, the processor controls the wireless communication module to search for the available network.

10. The mobile electronic device according to claim 8, wherein when the mobile electronic device is in the power save mode:

the processor controls the wireless communication module to stop searching for the available network.

11. The mobile electronic device according to claim 8, wherein the network searching inactive interval set up by the second timer is greater than the sleep interval set up by the third timer.

12. The mobile electronic device according to claim 8, wherein a maximum value of the time count of the first timer is equal to a sum of the network searching active interval and the network searching inactive interval.

13. The mobile electronic device according to claim 8, wherein the network searching active interval is greater than 240 seconds.

14. The mobile electronic device according to claim 8, wherein when the wireless communication module finds the available network, the wireless communication module registers the available network to connect to the available network.

* * * * *